UNITED STATES PATENT OFFICE.

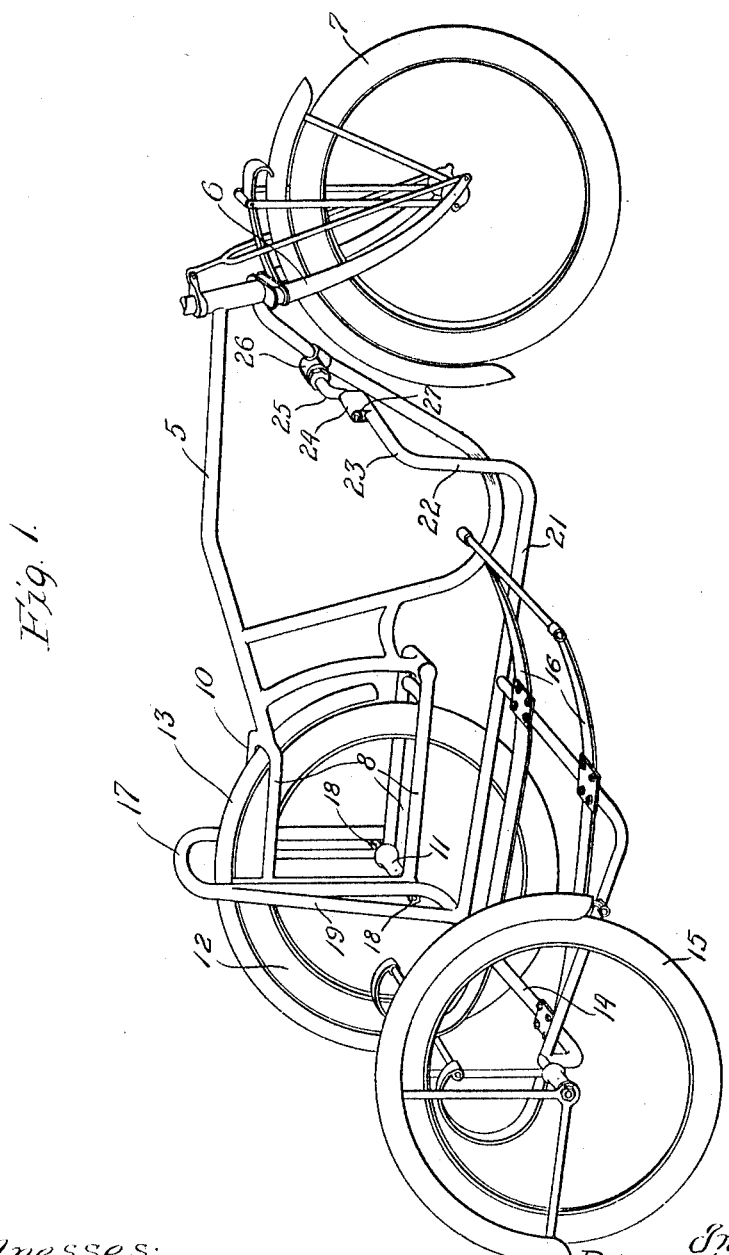

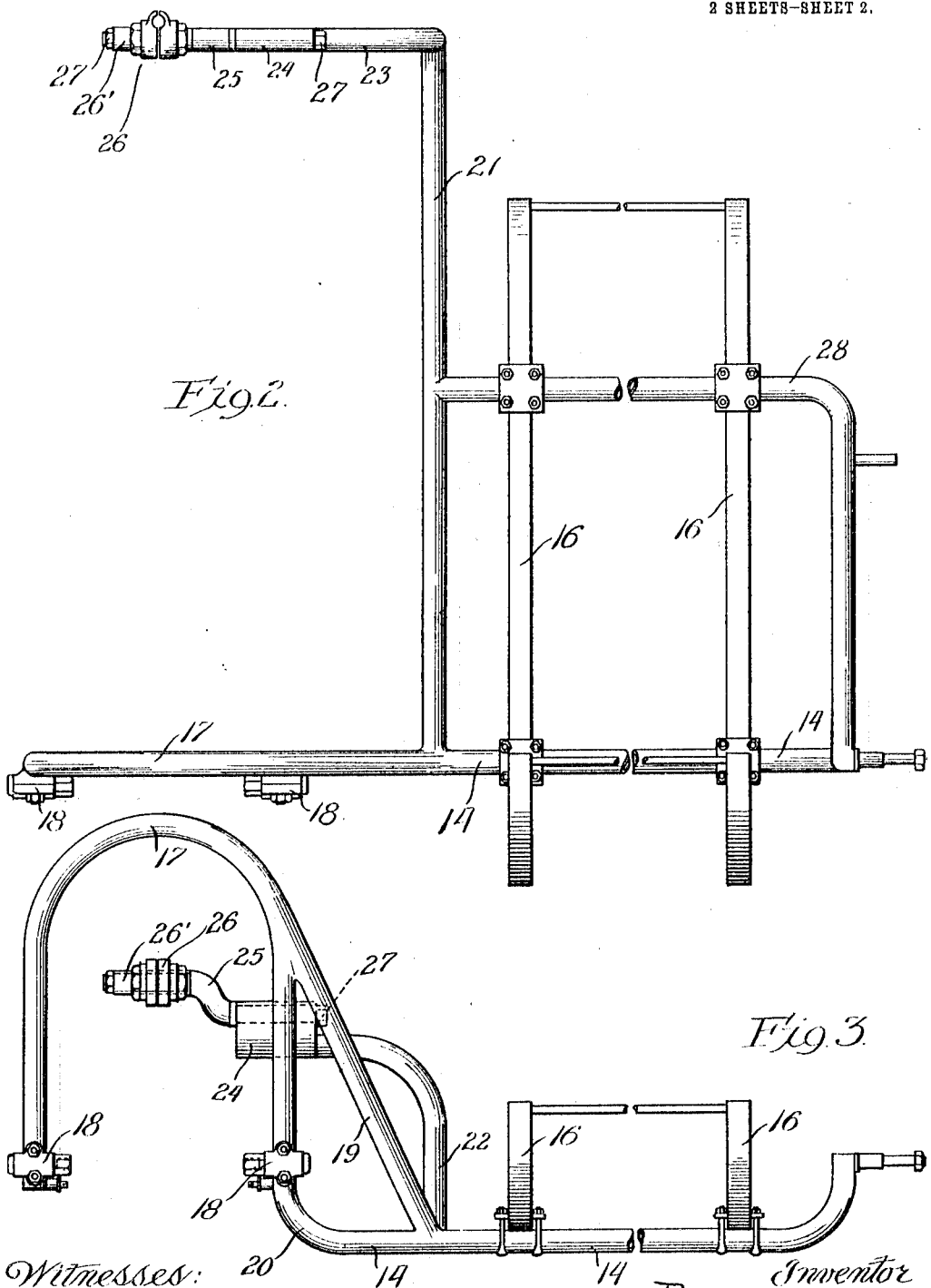

RALPH F. ROGERS, OF CHICAGO, ILLINOIS.

MOTOR-CYCLE SIDE-CAR FRAME.

1,118,445.   Specification of Letters Patent.   Patented Nov. 24, 1914.

Application filed February 17, 1913. Serial No. 748,829.

*To all whom it may concern:*

Be it known that I, RALPH F. ROGERS, a citizen of the United States, residing at Chicago, in the county of Cook and State of Illinois, have invented certain new and useful Improvements in Motor-Cycle Side-Car Frames, of which the following is a specification.

My invention relates to motorcycle side car frames and contemplates improved features of construction and arrangement. Side car structures for motorcycles are coming into extensive use, both for pleasure and commercial purposes. It is very desirable that such side car frames be adapted for quick attachment or detachment and adapted for fitting different styles of motorcycles. Furthermore, the association should be such that the free operation of the motorcycle is not interfered with by the attachment and that the motorcycle and attachment will operate in harmony to give the most efficient results. Heretofore side car frames have been attached to the motorcycle structure at only one side thereof, that is, the rear of the car was connected at only one side of the rear axle, the result being that the weight of the car with its load would fall at one side of the traction wheel vertical center and would tend to tilt the cycle, thus introducing severe strain and more or less interfering with the operation of the cycle.

One of the important objects of the invention is therefore to provide such construction and arrangement in a side car frame that the weight of the side car will act equally on both sides of the cycle traction wheel with the resultant vertical pressure along the vertical central line of the traction wheel to thus eliminate all tendency to tilt the cycle and relieving the cycle of all unnecessary strain. The connection of the side car frame with the cycle is therefore in the nature of an arch spanning the cycle traction wheel and secured to the ends of the wheel axle.

Another object of the invention is to provide such connection of the car frame with the cycle structure that the frame will not interfere with the relative movements of the cycle parts, particularly where the traction wheel supporting structure is pivoted for vertical movement relative to the cycle main frame. The side car frame is therefore connected at its front end with the frame body of the cycle by means of a pivotal coupling which will allow more or less bodily movement of the side car frame with reference to the cycle structure and allow the car frame to move bodily with the cycle driving wheel structure, particularly where such wheel structure is pivoted to the cycle frame body. Such connection is also detachable with reference to the cycle and will also adapt the car frame for application to cycles having different styles of frame body.

In the drawings which show the various features of the invention Figure 1 is a perspective view of the side car frame applied to a motorcycle; Fig. 2 is an enlarged plan view of the side car frame; and Fig. 3 is an end elevational view thereof.

The motorcycle shown is of the well known construction and is shown in detail only sufficiently to illustrate the application thereto of my improved side car frame. The cycle comprises a frame body 5 pivoting the fork 6 for the front wheel 7. The rear section 8 supports the axle 11 for the wheel 12, the wheel being surrounded by the fender 13.

Referring now to the side car frame, the axle 14 pivots at its outer end the wheel 15 and supports one end of the spring structures 16 on which the car body, not shown, is supported. The inner end of the axle 14 is bent to form the arch 17 for receiving the traction wheel structure of the cycle, the lower ends of the arch section carrying receiving members 18 for the opposite ends of axle structure 11. With this arrangement, the weight of the side car and load on the motor cycle bears on both sides of the cycle traction wheel and is substantially equal on both sides so that the resultant pressure line will always be in the plane of the driving wheel thus perfectly balancing the combination and eliminating all tendency for the side car attachment to over-balance and to tilt the motorcycle, leaving the motorcycle entirely free to operate and run in its normal capacity. The arch section by being securely attached to the ends of the motor cycle wheel axle will greatly strengthen the rear cycle structure and add to the stability thereof and will thus compensate for the load added to the motor cycle by the side car. In order to strengthen the axle structure 14 and the arch section thereof, a strut 19 bridges the bend 20 at the base of the arch section. The car side frame is connected at its front end with the frame body 5 of the motor cycle and such connection must be sufficiently yielding and flexible to allow the side car frame to follow the various movements of the cycle structure 8 to which the inner end of the side frame is rigidly attached by its arch section. The connection should also be such that the side car frame may be adapted for application to motorcycles having different styles of body frames. Extending forwardly from the axle 14 of the side car frame is the beam 21, the front end of this beam being deflected to provide the vertical section 22 and the inwardly extending end section 23. The end section 23 terminates in the bearing block 24 for receiving the outer end of a crank shaped coupling link 25. The inner end of this coupling link extends through and journals in the sleeve 26' of a clamp 26 adapted for detachable and adjustable application to the frame body 5 of the motorcycle as indicated. The link 25 is longitudinally adjustable in the sleeve by means of nuts 27 so that the front end of the car frame can be adjusted laterally with reference to the cycle frame. As the link has pivotal engagement with both the clamping member 26 and the car frame, this frame is free to follow the various flexures, torsional movements, and so forth, of the cycle structure so that free and easy running will result without restraining in any way the normal operation of the motorcycle. The flexible connection described will also adapt the car frame for application to motorcycles of different styles.

As motorcycles are usually equipped with pedals, the beam 21 is set outwardly sufficiently to leave sufficient clearance for operation of the pedals. Extending from intermediate point of the beam 21 to the outer end of the axle 14 is the L-shaped frame part 28 whose transverse section is parallel with the axle and supports the front end of the spring structures 16 which support the car body (not shown). This frame member 28 also serves to brace the axle 14 and to connect the outer end thereof more directly with the motorcycle body, torsional or twisting strains on the motorcycle and particularly the driving structure thereof being thus prevented, there being a more direct pull component between the motorcycle frame and the outer end of axle 14.

I thus provide a side car structure for cycles which can be readily attached thereto or detached therefrom and which will fit various styles of cycles. The arch arrangement will distribute the load equally on both sides of the cycle so that the cycle may run true without unnecessary strain, the arch strengthening the cycle structure to compensate for the additional load on the cycle. The flexible coupling at the front end of the car will allow the cycle to run without hindrance or interference by the car and the car itself will be more able to follow the varying surface over which it travels.

I do not, of course, desire to be limited to the precise construction and arrangement shown and described as modifications might be made without departing from the scope of the invention and

I claim the following:

1. A side car frame attachment for cycles having an axle bent at its inner end into an arch for receiving the cycle frame and having means at the ends of the arch for engaging with the cycle frame at the opposite sides thereof.

2. In a side car frame, the combination of an axle, a wheel journaled at the outer end of said axle, the inner end of said axle being bent into an arch for receiving the frame of a cycle, means at the ends of said arch for securing such ends to the cycle frame at opposite sides thereof, and a coupling member at the front end of said side car frame for connecting said end with the cycle frame.

3. In a side car frame, the combination of an axle, a wheel journaled at the outer end of said axle, the inner end of said axle being bent into an arch for receiving the frame of a cycle, means on the sides of said arch for securing said sides to the cycle frame at opposite sides thereof, and a flexible connecting member at the front end of said car frame adapted for detachable connection with said cycle frame.

4. In a side car attachment for cycles, the combination of a frame having an axle, a wheel journaled to the outer end of said axle, an arch forming an integral part of said frame and extending from the inner side of said frame for straddling the frame of a cycle, and means for securing the sides of said arch to said frame at the opposite sides thereof.

5. In a side car attachment for cycles, the combination of a frame having an axle, a wheel at the outer end of said axle, an arch forming an integral part of said frame and extending from the inner side of said frame for straddling the rear wheel structure of a cycle, means on the arch sides for detachably securing said sides to the opposite ends of the axle for said rear wheel structure, and means for connecting the front end of said frame with the frame of the cycle.

6. In a side car attachment for cycles, the combination of a supporting frame having an axle, a wheel journaled at the outer end of said axle, the inner end of said axle being bent into an arch for straddling the rear wheel structure of a cycle, means for detachably securing the sides of said arch to said wheel structure at the ends of the axle thereof, and means for flexibly securing the front end of said frame to the cycle frame body.

7. In a side car attachment for cycles, the combination of a supporting frame having an axle, a wheel journaled at the outer end of said axle, the inner end of said axle being bent into an arch for straddling the rear wheel structure of a cycle, means for detachably securing the sides of said arch to said wheel structure at the ends of the axle thereof, a link pivotally connected with the front end of said frame, and a clamping member pivotally connected with the end of said link and adapted for detachable and adjustable connection with the frame body of the cycle.

8. In a side car attachment for cycles, the combination of an axle bent at its inner end into an arch for receiving a cycle structure, means for connecting the sides of said arch with the cycle frame at opposite sides thereof, and a strengthening member bridging the bend between the arch and the axle body.

In witness whereof, I hereunto subscribe my name this 15th day of February, A. D., 1913.

RALPH F. ROGERS.

Witnesses:
SADIE M. RYAN,
JAMES R. OFFIELD.

Copies of this patent may be obtained for five cents each, by addressing the "Commissioner of Patents, Washington, D. C."